April 24, 1951  R. F. WILD  2,550,030
MEASURING AND CONTROLLING APPARATUS
Filed June 29, 1949  2 Sheets-Sheet 1

INVENTOR.
RUDOLF F. WILD
BY Arthur H. Swan
ATTORNEY.

April 24, 1951 R. F. WILD 2,550,030
MEASURING AND CONTROLLING APPARATUS
Filed June 29, 1949 2 Sheets-Sheet 2

INVENTOR.
RUDOLF F. WILD
BY Arthur H. Swanson
ATTORNEY.

Patented Apr. 24, 1951

2,550,030

UNITED STATES PATENT OFFICE 2,550,030

MEASURING AND CONTROLLING APPARATUS

Rudolf F. Wild, Wilmington, Del., assignor to Minneapolis-Honeywell Regulator Company, Minneapolis, Minn., a corporation of Delaware Application June 29, 1949, Serial No. 101,973

4 Claims. (Cl. 250—27)

The present invention relates to self-balancing measuring and control apparatus of the general type disclosed and claimed in my prior application, Serial No. 678,256, filed June 21, 1946, which issued as Patent No. 2,506,006 on May 2, 1950. The apparatus disclosed in said prior application comprises a direct current circuit network which includes a source of variable unidirectional voltage to be measured and an opposing voltage of fixed magnitude, and which is adjustable to balance voltage drops created in said circuit by the two voltage sources, and a reversible alternating current motor operable to adjust said network, and means for operating said motor to rebalance said network when unbalanced by a change in said variable voltage. The means included in said apparatus for operating the rebalancing motor comprises a converter, an electronic voltage amplifier and electronic motor drive means.

Said converter is connected to said network, and operates, when the network is unbalanced by an increase or decrease in the variable voltage, to produce an alternating current signal of a predetermined relatively low frequency, usually 60 cycles per second. That signal is proportional in magnitude to the increase or decrease in the variable voltage, and is of one phase or the opposite phase accordingly as the variable voltage change is an increase or decrease. The amplifier has an input circuit on which the signal produced by the converter is impressed, and an output circuit through which the signal amplified in the amplifier is impressed on the motor drive means. The motor drive means disclosed in said application comprises a pair of electronic valves, each having a control grid on which said control signal is impressed. The anode of each motor drive valve is supplied with alternating current which is of the above mentioned frequency and which is opposite in phase to the current supplied to the other motor drive valve. The current supplied to one or the other of said anodes is substantially in phase with the amplified signal impressed on the control grids of the valves. The output currents of the two motor drive valves are passed through the control winding for the rebalancing motor which also includes a power winding energized by alternating current of the above frequency.

In said prior application, measuring and control apparatus of the above mentioned type is combined with means for utilizing the electronic amplifying means of said apparatus in creating a high frequency oscillating current signal which appears in, and disappears from the output circuit of the amplifier on predetermined variations in the operation of the apparatus. Said high frequency oscillating current signal of said prior application is superimposed on the said low frequency current which is undergoing amplification and which is so proportioned that said high frequency signal is cut off or clipped in the amplifier or is carried into the output circuit, depending on variations in particular conditions of operation of the apparatus which are indicated by the appearance or non-appearance of the high frequency signal in the high frequency circuit.

One of the forms of the invention disclosed in said prior application includes means for utilizing the high frequency signal, developed as the network is brought back into balance after being unbalanced, to subject the rebalancing motor to a damping or braking action so as to reduce the risk of overtravel of the motor. The means provided for thus damping the rebalancing motor is especially advantageous because it may be used to check the operation of the motor prior to the attainment of complete balance, and after the motor operation is thus checked, the damping action may be quickly eliminated, so that the apparatus then has full sensitivity to respond to a new unbalancing action which may then occur, and if no such action then occurs, the motor may then complete the rebalancing adjustment and avoid the creation of a significant dead zone or spot.

The present invention is an improvement on the invention disclosed and claimed in said prior application, and its general object is to provide improved means for utilizing the high frequency oscillations developed in the rebalancing operation in controlling the motor damping or braking action.

A primary object of the present invention is to provide novel and effective means for utilizing the cathode currents of the two motor drive valves in controlling the derivation, from the high frequency current developed, of a D. C. damping signal which is so fed back into the direct current circuit network as to reduce its unbalance and thus provide anticipatory control of the rebalancing operation then being effected.

A more specific object of the present invention is to so combine two simple rectifiers such as diodes or crystal rectifiers with the two motor drive valves that the relative amounts of the high frequency signal current rectified by the two rectifiers are dependent upon the relative magnitudes of the cathode output currents of the two motor drive valves; and to so combine the two rectifiers with the direct current circuit network that the rectified outputs of the two rectifiers tend to produce current flows in opposite directions in said network.

In the forms of the invention illustrated herein, the rebalancing motor is a reversible rotating alternating current motor. However, the provisions disclosed herein for producing a damping signal and feeding it back into the measuring circuit, are also applicable for use in systems including direct current rebalancing motors, such for example, as solenoid motors.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 1a is a simplified diagram illustrating the operative relation of rectifying portions of the circuit network shown in Fig. 1.

Figure 1:
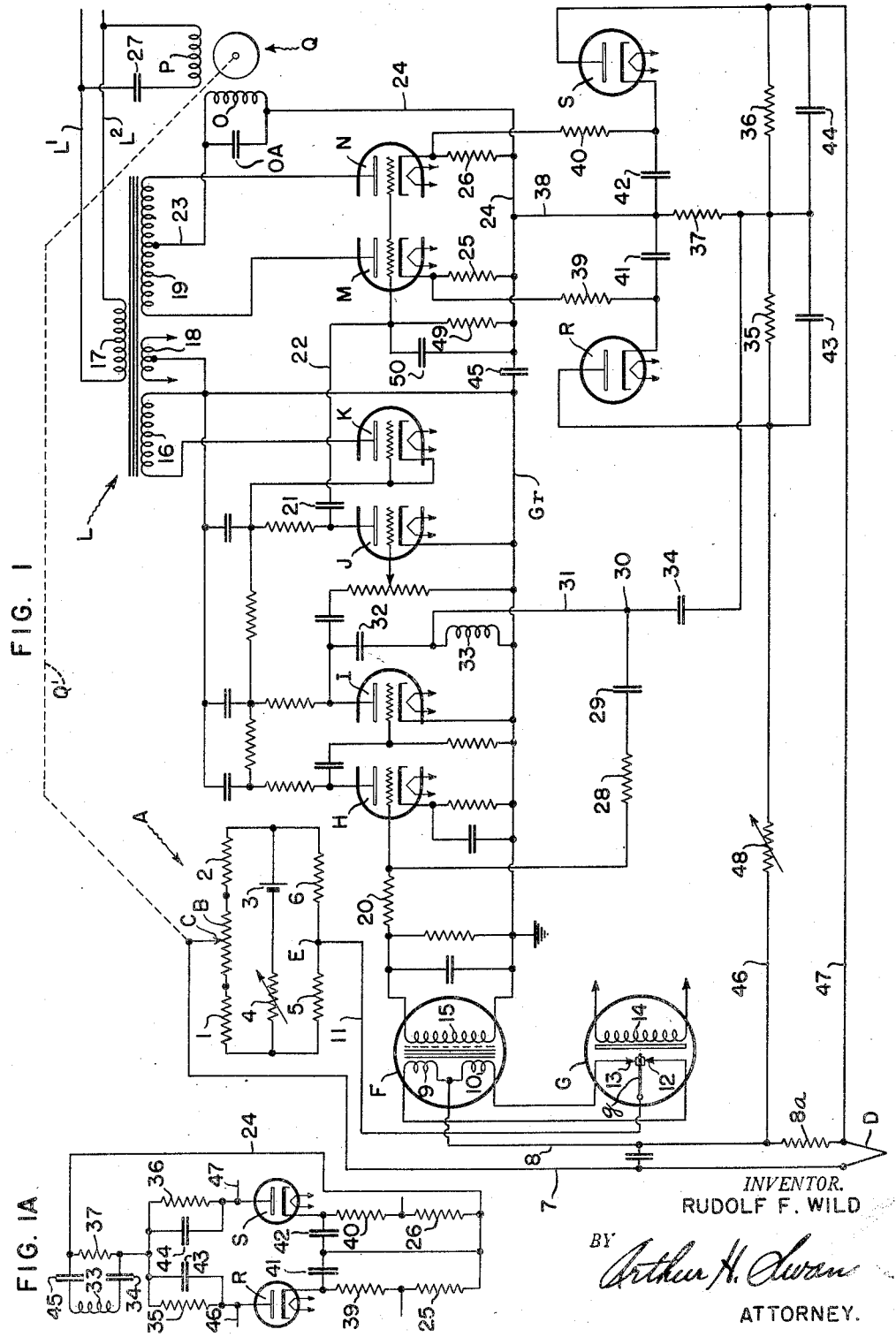
Fig. 1 is a diagram illustrating an embodiment of the present invention.

The embodiment of my present invention diagrammatically illustrated by way of example in Fig. 1 comprises potentiometric measuring and control apparatus of the so-called conversion type disclosed in the Wills Patent 2,423,540, granted July 8, 1947. In the apparatus shown in Fig. 1, the potentiometric adjustments are effected by an automatically controlled reversible motor Q. The automatic control system controlling the operation of the motor includes an electronic amplifier and means comprising a pulsator and transformer which cooperate to develop and amplify an alternating control signal varying in magnitude and phase with the magnitude and direction of the potentiometer unbalance produced by a change in the voltage of a thermocouple, or other source of a small voltage to be measured.

The apparatus shown diagrammatically in Fig. 1, comprises a potentiometric bridge circuit A including a slide wire resistance B along which a slider contact C is adjusted through a shaft connection Q' rotated by the motor Q. The bridge circuit A is of conventional type, comprising a branch including the slide wire resistor B connected between resistances 1 and 2, an energizing branch including a source of current 3 and a regulable resistance 4 connected in series, and a third branch which is connected in parallel with each of the previously mentioned branches, and includes series connected resistances 5 and 6.

As shown in Fig. 1, the apparatus is used to measure the voltage of a thermocouple D. The latter has a terminal conductor 7 directly connected to the slider contact C, and has a second terminal conductor 8 which includes a resistor 8a and which is indirectly connected to the junction point E between the bridge circuit resistances 5 and 6, by means including the connected primary winding sections 9 and 10 of a transformer F, the stationary contacts of a pulsator G and a conductor 11 directly connecting the bridge point E to the vibrating contact g of the pulsator G. The conductor 8 is directly connected to the terminal junction point of the windings 9 and 10. The second terminal of the winding 9 is connected to a stationary contact 12 of the pulsator G, and the second stationary pulsator contact 13 is connected to the second terminal of the winding 10. The vibrating contact g is located between and alternately engages the contacts 12 and 13. When the contacts g and 12 engage, the thermocouple current flows between the thermocouple D and bridge point E through a circuit including resistor 8a, conductor 8, winding 9, contact 12, contact g, and conductor 11. When the contact g is in engagement with the contact 13, current flows between the thermocouple and the bridge point E through resistor 8a, conductor 8, winding 10, contact 13, contact g, and conductor 11.

The pulsator contact g is polarized and vibrates with the frequency of the alternating current flowing through the coil 14 which may well be of the usually commercially available 60 cycles per second frequency. The currents flowing alternately in opposite directions through the windings 9 and 10 collectively form a transformer primary current which induces an alternating current of the same frequency in the secondary winding 15 of the transformer F. The magnitude of the current induced in the winding 15 depends upon, and is proportional to the difference between the thermocouple voltage and the difference in potential between the bridge contact C and the point E, and the current induced in the winding 15 is of one phase or the opposite phase, depending on whether the thermocouple current flow is in one direction or the opposite direction. That flow is in one direction when the thermocouple voltage exceeds the potential of the bridge contact C relative to the potential of the point E, and is in the opposite direction when the thermocouple voltage is less than the potential of the point E relative to the potential of the contact C. When the potential between the point E and contact C is equal to the thermocouple voltage, the bridge is balanced and no current flows through the thermocouple. When the bridge is unbalanced in one direction or the other, the current of one phase or of the opposite phase induced in the winding 15, causes the motor Q to rotate in the direction in which it needs to rotate to adjust the contact along the slide wire B as required to rebalance the measuring circuit and thereby interrupt the operation of the motor.

The current induced in the winding 15 is amplified in a multi-stage voltage amplifier shown diagrammatically as comprising amplifying triode valves H, I and J. A valve K which may be similar to the amplifier valves H, I and J but is connected for operation as the diode, serves as a rectifier valve to supply anode current to the valves H, I and J. The anode of the valve K is connected to one terminal of the secondary winding 16 of a transformer L, the second terminal of said winding being grounded. The transformer L has a primary winding 17 connected across the alternating current supply conductors L' and L², which may form parts of an available distribution system of conventional frequency and voltage, such as 60 cycles per second, and 115 volts. The transformer L has second and third secondary windings, 18 and 19. The winding 18 is adapted to supply energizing current to the pulsator coil 14, and to supply heating current to the cathode heating filaments of the valves H, I, J and K, and of other valves hereinafter mentioned.

The terminals of the transformer secondary winding or coil 15, are connected to one another by loading impedance, and are connected to the input circuit of the first stage amplifier valve H, one terminal being connected to the control grid of the valve H through a resistor 20, and the other terminal being connected to the grounding conductor Gr to which the cathodes of each of the valves H, I and J are connected. The anodes of the valves H and I are respectively coupled to the control grids of the valves I and J, and the anode of the valve J is connected through a coupling condenser 21 and conductor 22 to the connected control grids of the motor drive valves M and N.

Each of the valves M and N may well be a triode of a known commercially available type. The anode of the valve M is connected to one end terminal of the secondary winding 19 of the transformer L, and the anode of the valve N is connected to the second end terminal of the winding 19. The secondary winding 19 has a center tap terminal 23 connected to one terminal of the control winding O of the motor Q. The control winding O is connected in parallel with a tuning condenser OA, and the second terminals of the winding O and condenser OA are connected by the conductor 24 to the cathodes of the motor drive valves M and N through their respective cathode resistors 25 and 26. The power winding P of the motor Q is connected across the supply conductors L' and L² in series with a condenser 27.

Except for special features provided for damping purposes in accordance with the present invention and hereinafter referred to in detail, the electronic voltage amplifying and motor drive apparatus shown diagrammatically in Fig. 1, requires no further explanations or description herein, since it comprises nothing claimed as novel herein, and is fully disclosed and claimed in the above mentioned Wills patent, and is in extensive public use in this country.

In accordance with the present invention, the first and second stage valves H and I of the voltage amplifier shown in Fig. 1 are included in an oscillating circuit in which oscillation occurs as a result of the action of a feed back circuit connecting the output circuit of the second stage amplifier valve I to the control grid of the first stage amplifier valve H. Said feed back connection includes a resistor 28 and a condenser 29 connected in series between the control grid of the valve H, to which one terminal of the resistor 28 is directly connected, and the circuit point 30, at which one terminal of the condenser 29 is connected to a conductor 31. The latter connects the point 30 to the anode of the valve I, through a condenser 32, and to the cathode of the valve I through a choke coil 33. An RF signal, when present in the feed back connection, is taken therefrom at the point 30 through a condenser 34 and is then rectified (after amplification, if necessary,) by diode rectifiers R and S, and appears as a D. C. damping signal across resistors 35 and 36, and is injected into the thermocouple circuit as hereinafter explained.

The resistors 35 and 36 are connected in series with one another between the anodes of the diodes R and S. The condenser 34 connects the feed back circuit point 30 to the connected ends of the resistors 35 and 36. A resistor 37 and conductor 38 connect the connected ends of the resistors 35 and 36 and the condenser 34 to the cathode of the valves M and N through their respective cathode resistors 25 and 26. The cathode of the valve R is connected to the cathode of the valve M by a resistor 39, and the cathode of the valve S is connected to the cathode of the valve N by a resistor 40. The cathode of the valve R is connected to the conductor 38 by a condenser 41, and the cathode of the valve S is connected to the conductor 38 by a condenser 42. High frequency bypass condensers 43 and 44 are connected in parallel with the resistors 35 and 36 respectively. The connected ends of the conductor 38 and cathode resistors 25 and 26 are connected by a condenser 45 to the grounding conductor Gr. The resultant of the damping signal developed across the resistors 35 and 36 is applied across the resistor 8a in the thermocouple circuit by conductors 46 and 47. As shown, the conductor 46 includes a variable resistor 48 through which the damping signal injected into the thermocouple circuit by the conductors 46 and 47 and resistor 8a may be regulated. The control grids of the valves M and N are connected to ground by a grid resistor 49 and a high frequency by-pass condenser 50, and through the condenser 45.

The rectifying actions of the diodes Q and R are controlled by the anode-cathode currents of the motor drive valves M and N. Thus the diode R can become conductive and rectify the high frequency alternating current and thereby create a damping voltage across the resistor 35, when, and only when, the potential drop in the resistor 37, which is included in the input circuit of the diode R and of the diode S, is in bucking relation with, and suitably exceeds, the voltage drop in the cathode resistor 25 produced by the motor drive current flow through the valve M. Similarly, the diode S can cause a current flow through the resistor 36 and thereby produce a damping voltage in said resistor when, and only when, the voltage drop in the resistor 37 is in bucking relation with and suitably exceeds the voltage drop in the cathode resistor of the valve N produced by the motor drive current flowing through the last mentioned valve.

In this connection, it is to be noted that a direct current circuit including the diode R of Fig. 1 can be traced from the anode of the diode through the resistor 35, resistor 37, conductor 38, resistor 25 and resistor 39 to the cathode of the valve R. The direct current circuit of the diode S differs from that of the diode R only in that it includes the resistors 36, 40 and 26 in lieu of the resistors 35, 39 and 25. The A. C. signal applied to the two diodes and utilized by them in producing the D. C. output voltage developed across the resistors 35 and 36 appears between ground and the junction point 30 at which the condenser 29, the condenser 32, the choke coil 33 and the condenser 34 are connected.

An alternating current circuit supplying high frequency current to the diodes R and S for rectification therein, can be traced from the grounded end of the choke coil 33 through the condenser 45, conductor 38, resistor 37, condenser 34, conductor 31 and choke coil 33.

The operative relation of above mentioned direct current circuits including the diodes R and S, and the alternating current circuit elements 33, 34, 45, and 37 of the network shown in Fig. 1, are illustrated in simplified form in Fig. 1a. As is made clearly apparent in Fig. 1a, the resistor 37 is included in the alternating current circuit and in each of the two rectifier circuits. The Fig. 1a diagram also makes plainly apparent that each of the rectifier diodes R and S can become conductive only when the voltage drop in the corresponding cathode resistor 25 or 26 is too low to bias the diode beyond cut off during the high frequency voltage half cycles in which the end of the resistor 37 connected to the condenser 45 is negative relative to the end of the resistor 37 connected to the corresponding load resistor 35 or 36.

The resistances of the resistors 35 and 36 are high relative to the resistances of the other resistors associated with the diodes R and S. Thus the resistance of each resistor 35 and 36 may be one megohm, the resistance of each resistor 25 and 26 may be 150 ohms, the resistance of the resistor 37 may be 250,000 ohms, the resistance of each of the resistors 39 and 40 may be 1500 ohms, and the resistance of the resistor 28 may be 250,000 ohms. The capacities of the condensers 28, 32 and 34 are 200, 100 and 100 microfarads respectively. The capacity of each of the condensers 41 and 42 is 25 microfarads, and the capacity of each of the condensers 43 and 44 is 0.001 microfarad, and the capacity of the condenser 45 is 0.1 microfarad. The inductance of the choke coil 32 is 25 millihenries.

In the operation of the apparatus shown in Fig. 1 under the condition in which the measuring circuit is widely unbalanced, the motor Q rotates at full speed in the proper direction to rebalance the circuit. In that operating condition, the low frequency signal impressed on the control grids of the motor drive valves M and N is of the phase and magnitude required to make one of the valves fully conductive and to cut off the other of those valves. The magnitude of said low frequency signal may then be so high that all of the high frequency oscillations will be cut off or clipped in the first two stages of the amplifier. As balance is approached, the magnitude of the low frequency signal will diminish sufficiently to permit high frequency oscillations to appear in the A. C. circuit including the resistor 37, though still being high enough to maintain the valve M fully conductive.

Consider, for example, the condition in which the valve M is fully conductive and the valve N is cut off. With the valves M and N of the type commonly employed in a motor drive system of the type illustrated, the potential drop in the cathode resistor 25 of the fully conductive valve M will then be about 2.5 volts, while the potential drop in the cathode resistor 26 of the valve N will be approximately zero. Said potential drop in the resistor 25 is in bucking relation to the potential drop in the resistor 37 during the half cycle periods in which the high frequency alternating current is flowing through the resistor 37 in the direction to make the diodes R and S conductive. The diode R is thus biased beyond cut off at times when the valve M is fully conductive, but the diode S is not so biased, and the potential drop in the resistor 37 then makes the diode operative to rectify some of high frequency alternating current passing to the resistor 37 during the half cycle periods in which the diode S may be made conductive. Conversely, when the measuring circuit unbalance is in such direction as to make the valve N fully conductive and to cut off the valve M, the diode S is biased beyond cut off by the voltage drop in the cathode resistor 26, and the diode R then becomes conductive and rectifies high frequency current passing to the resistor 37 during the half cycles in which the diode R can be made conductive.

A suitable portion of the unidirectional voltage developed by the diode R or S across the resistor 35 or 36, during the respective periods in which the valve N or the valve M is fully conductive, is injected into the measuring circuit. This injected voltage is of such magnitude and polarity as to materially reduce the motor speed, and may even cause the motor to momentarily come to a full stop. A reduction in the motor speed caused by a change in the signal voltage impressed on the control grids of the valves M and N, tends to make the cathode of the valve N positive as soon as that valve is no longer completely cut off. A limitation of the speed at which this can happen is set by the time constant of the resistor 36 and condenser 44. As the cathode potential of the valve N increases in the positive direction, the diode S is completely cut off, at which time the control voltage across the resistor 36 vanishes, as does the injected voltage across the resistor 8a. As the control voltage across the resistor 8a thus slowly vanishes, the motor slowly moves into the true balance position. Since, in balance, both of the diodes R and S are cut off, no voltage is then fed back into the thermocouple circuit, and the objectionable "dead spot" characteristic of prior damping systems is completely removed.

Figure 2:
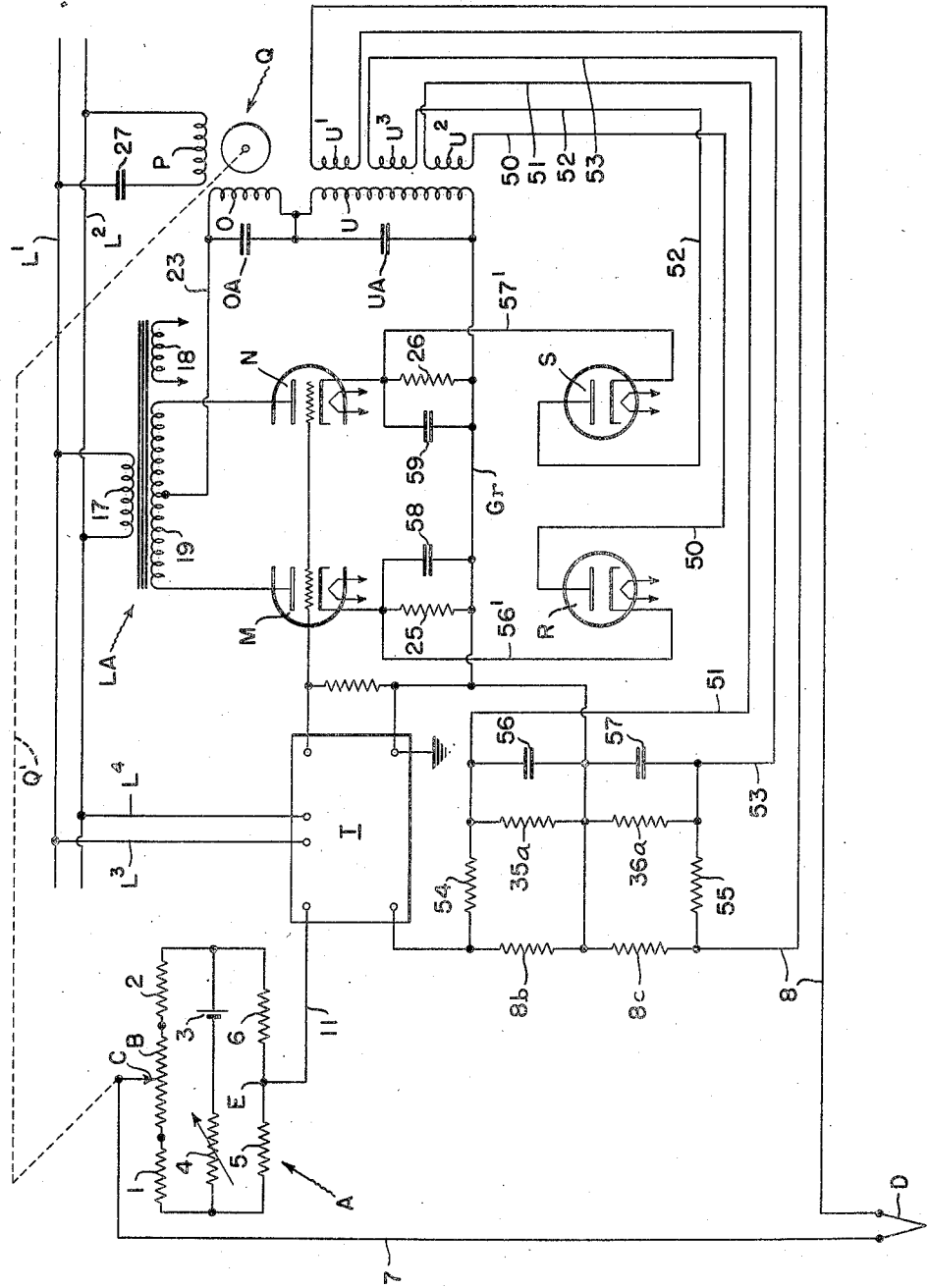
Fig. 2 is a diagram illustrating a second embodiment of the present invention.

The form of the invention illustrated diagrammatically in Fig. 2, is like the form illustrated in Fig. 1 in numerous respects, and various circuit elements of Fig. 2 which are like corresponding circuit elements of Fig. 1, are designated by the same reference symbols. The principal difference between the form of the invention shown in Fig. 2, and that shown in Fig. 1, is in respect to the manner in which diodes R and S of Fig. 2 are connected to the source of the high frequency current which they rectify, and the circuit connections through which the rectified damping signals are impressed on the thermocouple circuit.

In the form of the invention shown in Fig. 2, the voltage of a thermocouple D is measured by self-balancing measuring apparatus including a bridge circuit A, a rebalancing motor Q for adjusting the slider contact C, motor drive tubes M and N and conversion and voltage amplifying mechanism represented by the block diagram element T and including elements corresponding to the elements F, G, H, I, J and K of Fig. 1. The diagrammatic element T includes nothing corresponding to the choke coil 33 of Fig. 1. The motor Q of Fig. 2 is energized by a transformer secondary winding 19 as in Fig. 1. The winding 19 of Fig. 2 forms part of a transformer LA which, as diagrammatically shown, differs from the transformer L of Fig. 1 in that it includes no secondary winding corresponding to the winding 16 of Fig. 1. The purpose served by the winding 16 of Fig. 1, served in Fig. 2 by unillustrated means included in the amplifying element T, and energized by branches $L^3$ and $L^4$ of the supply conductors L' and $L^2$, respectively.

In the Fig. 2 arrangement, high frequency oscillations are produced, as balance is approached, in each rebalancing operation, as a result of the inter-action of coupled coils U and U'. The coil U and a condenser UA in parallel therewith, form a tuned circuit interposed between the grounding conductor Gr and the tuned circuit formed by the motor control winding O and condenser OA. The coil U is also inductively coupled to coils U² and U³. In Fig. 2 the thermocouple terminal 8 is connected to the terminal 11 of the bridge point E through conversion apparatus including elements corresponding to the elements F and G of Fig. 1 and included in the apparatus represented by the block diagram element T. In Fig. 2, the conductor 8 includes in lieu of the single resistor 8a, two series connected resistors 8b and 8c, and also includes the coil U'. The coil U² has one terminal 50 connected to the anode of the diode R and has its second terminal 51 connected to one terminal of a resistor 35a across which a unidirectional damping voltage is developed, as hereinafter explained. The coil U³ has one terminal 52 connected to the anode of the diode S, and has its second terminal 53 connected to one terminal of a resistor 36a.

The resistors 35a and 36a are connected in series between the coil terminals 51 and 53. A unidirectional damping signal is developed across the resistors 35a and 36a, generally as such a signal is developed across the resistors 35 and 36 of Fig. 1. The connected terminals of the resistors 8b and 8c and of the resistors 35a and 36a are connected to the grounding conductor Gr. The second terminals of the resistors 8b and 35a are connected by a resistor 54, and the second terminals of the resistors 8c and 36a are connected by a resistor 55. The resistors 35a and 36a are shunted by condensers 56 and 57, respectively, adapted to bypass high frequency currents. The cathode of the diode R is connected to the cathode of the valve M by a conductor 56' and the cathode of the diode S is connected to the cathode of the valve N by a conductor 57'. The cathode resistors 25 and 26 of the valves M and N are bypassed by condensers 58 and 59, respectively.

With the circuit arrangement shown in Fig. 2 and described above, the inductance coil U², the diode rectifier R and the resistor 35a with its bypass condenser 56 are connected in series relation across the cathode resistor 25 of the motor drive valve M. Similarly, the coil U³, the diode S and the resistor 36a with its bypass condenser 57 are connected in series across the cathode resistor 26 of the motor drive valve N. In Fig. 2, as in Fig. 1, during the portion of each rebalancing operation in which balance is not closely approached, one of the motor drive valves M and N will be fully conductive and the other valve will be practically non-conductive, and one of the diodes will be biased beyond cut off, while the other diode becomes conductive.

With little or no current flow through the cathode resistor 25 of the valve M, the diode R is not biased beyond cut off as the diode S then is, and operates to rectify high frequency signals developed across the coil U² and thereby develop a unidirectional control voltage across the resistor 35a. A suitable portion of this voltage, developed by attenuation across the resistor 54, is introduced into the thermocouple circuit. With proper apparatus, the damping voltage thus injected into the thermocouple, may be made of such magnitude and polarity as to greatly reduce the speed of the motor Q, or to cause the motor to momentarily come to a full stop.

While the forms of the invention shown in Figs. 1 and 2 operate in a generally similar manner, they have some significant operative differences. Thus in the Fig. 1 arrangement, the high frequency signals are produced by only the first two amplifier stages including the valves H and I, whereas in the Fig. 2 arrangement the whole amplifier is used in producing that signal. The Fig. 2 arrangement includes no series resonant circuit across the output of the second amplifier stage, such as is provided in the Fig. 1 arrangement to prevent substantially all of the high frequency oscillating signals from passing to the third amplifier stage. It is to be noted however, that any high frequency signal which does leak through into the third stage of the Fig. 1 arrangement is by-passed by the condenser 50 connected across the grid resistor 49 of the motor drive tubes.

Since in Fig. 2 all of the amplifier stages are utilized in the production of the high frequency signal, a sixty cycle motor drive signal of greater amplitude is required to cause the clipping of the high frequency signal with the arrangement shown in Fig. 2 than with the arrangement shown in Fig. 1. This follows from the fact that a smaller sixty cycle drive signal will cut off the third stage amplifier valve than is required to cut off the second or first stage valves. As a result on an approach to system balance, the high frequency signal will not appear as early in the arrangement shown in Fig. 2 as in the arrangement illustrated in Fig. 1. The arrangement shown in Fig. 1 is thus advantageous where it is designed to operate the rebalancing motor at very high speeds, since the faster the motor the earlier the anticipatory means must function to satisfactory damping.

With the arrangement shown in Fig. 2, no "sticking" upon departure of balance occurs, so long as the time constants of resistor 25, condenser 58 and resistor 26, condenser 59 are large enough so that full speed operation and the disappearance of high frequency oscillation are reached before the particular bias voltage has been reduced sufficiently to allow the associated diode to become conducting.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In measuring and control apparatus of the type comprising a signal circuit and means for developing therein a unidirectional signal varying in magnitude and polarity, a converter for converting said signal into a low frequency alternating current control signal of one phase or of the opposite phase depending on a polarity of said unidirectional signal, an electronic amplifier for amplifying said control signal, a feed back connection for transferring energy from one portion to another portion of said amplifier and thereby producing high frequency oscillations which appear in said amplifier while the magnitude of said control signal is decreasing, a pair of control valves each having an anode, a cathode, a control grid, a cathode resistor, and an output circuit including said anode, cathode, and cathode resistor, and means supplying alternating current of said relatively low frequency to the anode of each valve which is opposite in phase to the anode current supplied to the other valve and is of the same phase as one of the two phases first mentioned, the improvement comprising a high frequency network connected to said amplifier and in which said high frequency oscillations produce current flow and comprising two rectifier circuits each including one of said cathode resistors, a rectifier, a load resistor, and a portion of said network supplying high frequency current to said rectifier circuit for rectification therein when the last mentioned circuit is not biased beyond cut off by the voltage drop in the cathode resistor included in that circuit, and circuit connections between said load resistors and said signal circuit through which each load resistor injects a unidirectional voltage into said signal circuit proportional to the potential drop in that load resistor and opposite in polarity to the voltage injected into said signal circuit by the other load resistor.

2. In measuring and control apparatus of the type comprising a signal circuit and means for developing therein a unidirectional signal varying in magnitude and polarity, a converter for converting said signal into a low frequency alternating current control signal of one phase or of the opposite phase depending on the polarity of said unidirectional signal, an electronic amplifier for amplifying said control signal, a feed back connection for transferring energy from one portion to another portion of said amplifier and thereby producing high frequency oscillations which appear in said amplifier while the magnitude of said control signal is decreasing, a pair of control valves each having an anode, a cathode, a control grid, a cathode resistor, and an output circuit including said anode, cathode, and cathode resistor, and means supplying alternating current of said relatively low frequency to the anode of each valve which is opposite in phase to the anode current supplied to the other valve and is of the same phase as one of the two phases first mentioned, the improvement comprising two rectifier circuits, each including one of said cathode resistors, a rectifier, and a load resistor, a high frequency circuit connected to said amplifier, a resistor common to the last mentioned circuit and to each of said rectifier circuits and supplying high frequency current to each rectifier circuit for rectification therein when the last mentioned circuit is not biased beyond cut off by the voltage drop in the cathode resistor included in that circuit, and circuit connections between said load resistors and said signal circuit through which each load resistor injects a unidirectional voltage into said signal circuit proportional to the potential drop in that load resistor and opposite in polarity to the voltage injected into said signal circuit by the other load resistor.

3. In measuring and control apparatus of the type comprising a signal circuit and means for developing therein a unidirectional signal varying in magnitude and polarity, a converter for converting said signal into a low frequency alternating current control signal of one phase or of the opposite phase depending on the polarity of said unidirectional signal, an electronic amplifier for amplifying said control signal, a feed back connection for transferring energy from one portion to another portion of said amplifier and thereby producing high frequency oscillations which appear in said amplifier while the magnitude of said control signal is decreasing, a pair of control valves each having an anode, a cathode, a control grid, a cathode resistor, and an output circuit including said anode, cathode, and cathode resistor, and means supplying alternating current of said relatively low frequency to the anode of each valve which is opposite in phase to the anode current supplied to the other valve and is of the same phase as one of the two phases first mentioned, the improvement comprising a high frequency network connected to said amplifier and including two portions in which said high frequency oscillations produce high frequency current and comprising two rectifier circuits one including one and the other including the second of the last mentioned portions and each also including one of said cathode resistors, a rectifier, and a load resistor, each of said last mentioned portions supplying high frequency current to the corresponding one of said rectifier circuits for rectification therein when the last mentioned circuit is not biased beyond cut off by the voltage drop in the cathode resistor included in that circuit, and means connecting said load resistors to said signal circuit so that each injects a unidirectional voltage into said signal circuit proportional to the potential drop in that load resistor and opposite in polarity to the voltage injected into said signal circuit by the other load resistor.

4. A measuring and control apparatus improvement as specified in claim 3, in which said high frequency network includes a transformer having a primary winding and three secondary windings, two of which secondary windings form the network portions included in said rectifier circuits, and in which the third secondary winding is included in said feed back connection.

RUDOLF F. WILD.

REFERENCES CITED

The following references are of record in the file of this patent:

UNITED STATES PATENTS

| Number | Name | Date |
| --- | --- | --- |
| 2,426,711 | Shaffer | Sept. 2, 1947 |